United States Patent
Larsen

[15] 3,674,898
[45] July 4, 1972

[54] METHOD FOR BIAS CUTTING A TUBULAR NET

[72] Inventor: Ronald L. Larsen, Minneapolis, Minn.
[73] Assignee: Conwed Corporation
[22] Filed: Feb. 24, 1971
[21] Appl. No.: 117,922

Related U.S. Application Data

[63] Continuation of Ser. No. 793,079, Jan. 22, 1969, abandoned.

[52] U.S. Cl. ............................. 264/146, 264/167, 264/210, 264/312, 156/174
[51] Int. Cl. .................................. B29d 23/04, B29d 7/16
[58] Field of Search ................ 264/DIG. 81, 146; 156/174, 156/167

[56] References Cited

UNITED STATES PATENTS

| 1,317,426 | 9/1919 | Brennan | 264/146 |
| 2,943,356 | 7/1960 | Rasmussen | 264/146 X |
| 3,342,657 | 9/1967 | Dyer | 264/146 X |
| 3,437,538 | 4/1969 | Ewing | 264/146 X |

*Primary Examiner*—Robert F. White
*Assistant Examiner*—Allen M. Sokal
*Attorney*—Eyre, Mann & Lucas

[57] ABSTRACT

This invention provides a method for continuously severing a rotating and axially moving tubular net, having an axially oriented pattern, along a bias line thereof to transform the tubular net into a continuous flat web having a length oriented pattern different from the axially oriented pattern of the tubular net.

9 Claims, 10 Drawing Figures

PATENTED JUL 4 1972 3,674,898
SHEET 1 OF 2
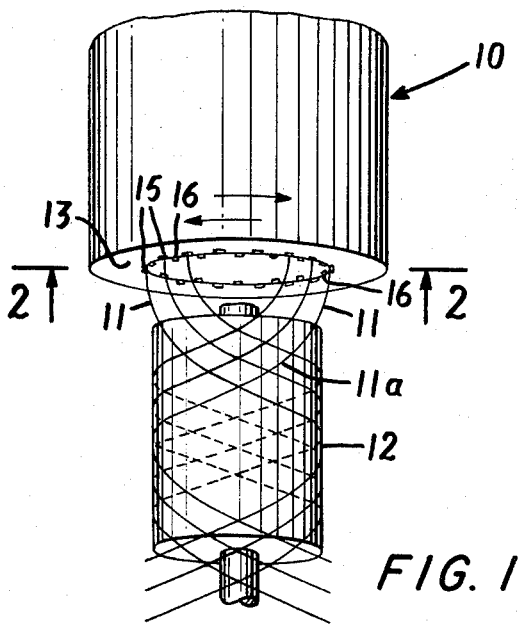
FIG. 1
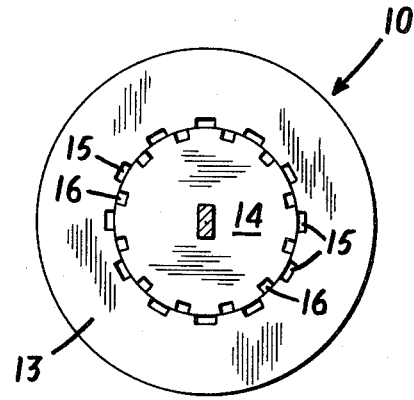
FIG. 2
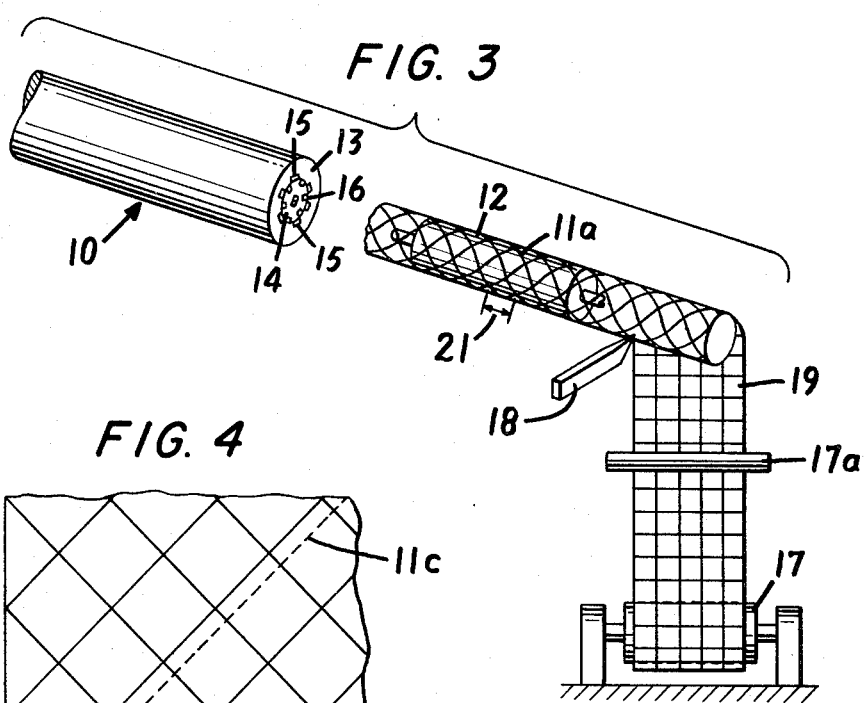
FIG. 3
FIG. 4
INVENTOR.
RONALD L. LARSEN
BY Eyre, Mann, & Lucas
ATTORNEYS

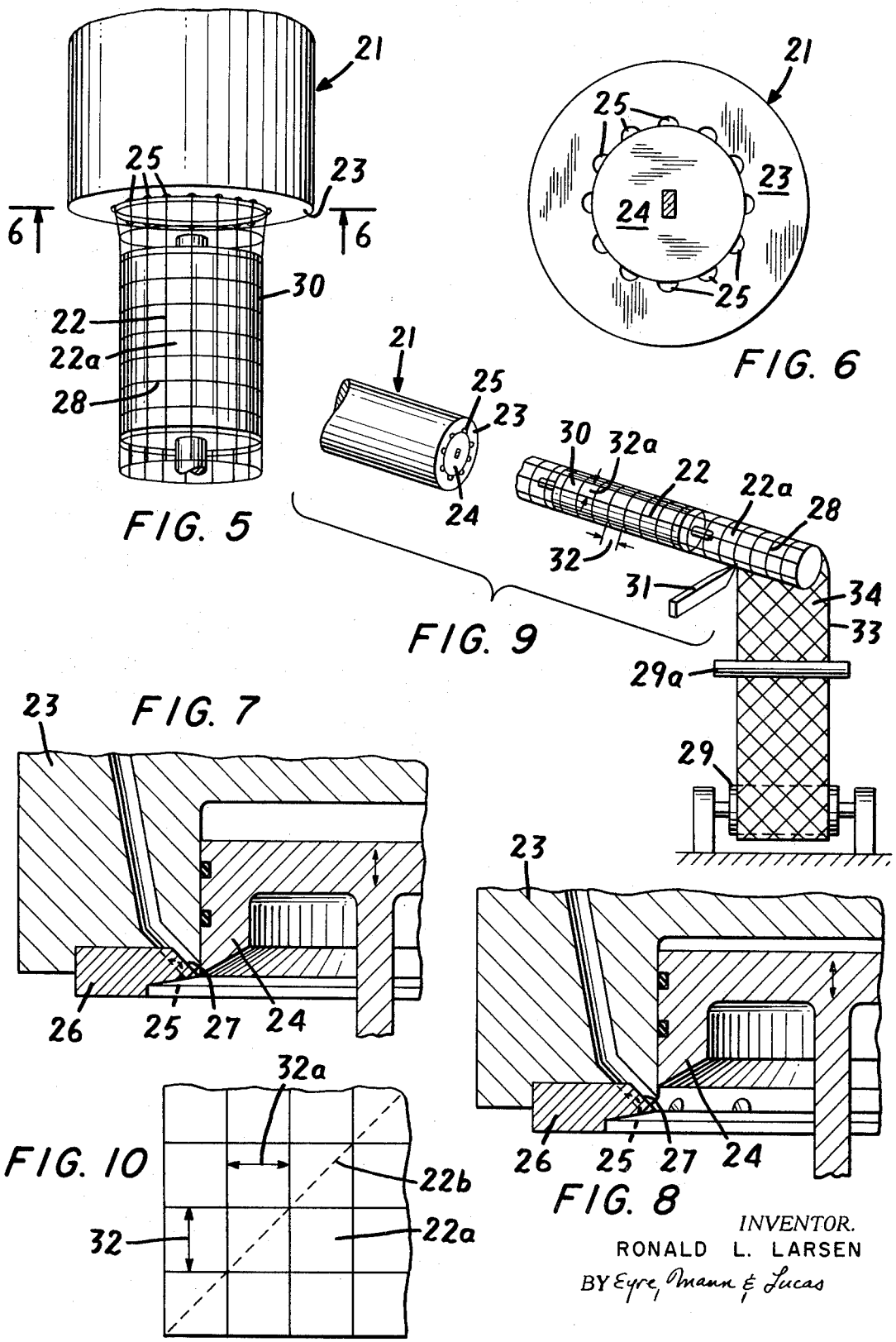

METHOD FOR BIAS CUTTING A TUBULAR NET

The present application is a continuation of my earlier filed application, Ser. No. 793,079 filed Jan. 22, 1969 and now abandoned.

This invention relates principally to a method for severing a tubular net having an axially oriented pattern and composed of a plurality of individual fibers strands or threads in a predetermined manner to transform the tubular net into a flat web having a length oriented pattern different from the axially oriented pattern of the tubular net.

The term "axially oriented pattern" as here used means the geometric shape of the tubular net pattern as viewed perpendicular to the surface of the tubular net with its axis held vertically. The term "length oriented pattern" as here used means the geometric shape of the flat web pattern as viewed perpendicular to the flat web surface with one of the length sides of the flat web held vertically.

It is well known in the art how to make tubular netting having an axially oriented pattern, the tubular net being composed of a plurality of individual fibers. Two polymer extrusion processes for manufacturing these tubular net structures are disclosed in U.S. Pats. Nos. 3,252,181 and 3,070,840. The present invention however is not limited to any particular method or apparatus for manufacturing the tubular net, extrusion or otherwise, but for simplicity, the process of the present invention will be described in terms of the extrusion processes disclosed in the above patents.

In accordance with U.S. Pat. No. 3,070,840, tubular net having a diamond or similar axially oriented pattern is produced by extrusion of two sets of straight fibers from two dies, the two dies being concentric and adapted to counter-rotate with respect to each other. The individual fibers of one set intersect with the individual fibers of the other set at various points at an angle to each other to form the desired pattern.

In U.S. Pat. No. 3,252,181, there are also two dies arranged coaxially with respect to each other. In forming tubular net in accordance with this patent, the dies are not normally rotated with respect to each other. Instead, one of the dies remains stationary to extrude fibers axially and the other die moves axially with respect to the stationary die to periodically extrude a circular fiber which adheres to to the axially extruding fibers to form a tubular net having a parallelogram or similarly axially oriented pattern. The tubular net structure manufactured according to either patent is usually pulled down over a forming mandrel after extrusion and into a setting bath where the polymer extrudate is cooled and hardened into final form.

In both of the above processes, the tubular net is both extruded and pulled axially downwardly without rotation of the tubular net. Forces tending to rotate the tubular net are balanced out by counter-rotation of the dies in U.S. Pat. No. 3,070,840 and in U.S. Pat. No. 3,252,181, there are no forces tending to rotate the tubular net because the dies forming the tubular net are rotationally stationary.

In accordance with the present invention, the extruding tubular net is severed along a helix line which corresponds to a particular family of bias lines in the tubular net. The term "bias line" as here used means a particular helix along which the tubular net is severed whereby the particular axially oriented pattern of the tubular net is transformed into the desired length oriented pattern of the flat web. The term "bias line" as here used includes, but is not restricted to, lines at 45° angles to the axis of the extruding tube as the tubular net may be severed at any desired angle.

Tubular net made according to U.S. Pat. No. 3,070,840 will have an axially oriented diamond pattern which, when severed along a bias line at 45° to the tube axis, will be transformed into a flat web having a length oriented parallelogram pattern. If all the angles between intersecting fibers of the axially oriented diamond pattern are 90°, then the length oriented pattern of the flat web will be either square or rectangular. The term "parallelogram" as used here and in the appended claims includes all parallelogram shapes, including squares and rectangles except where the word is limited in context to a particular shape or shapes.

Tubular net made in accordance with U.S. Pat. No. 3,252,181, will generally have a square or rectangular axially oriented pattern which will always be transformed into an axially oriented diamond pattern when the tubular net is cut on a bias line parallel to a diagonal of the square or rectangle.

The means for severing the tubular net, which may be heat or a conventional knife, can be rotated about the mandrel surface in accordance with one aspect of the present invention in a predetermined relation to the speed at which the formed tubular net is pulled downwardly over the mandrel i.e., the speed of one turn of the severing means about the mandrel must be substantially equal to the time it takes the lead of the helix along which the tubular net is being severed to advance, so that the cut is always on the same bias line. The windup means for gathering the severed net must also be rotated conjointly with the cutter machanism to prevent the severed net from becoming twisted.

For reasons of economy, it is preferred that the extruding tubular net be rotated rather than the severing and windup means so that the severing means and the windup means may remain stationary with respect to the extrusion apparatus. Rotational movement of the extruding tubular net is preferably induced and controlled by rotating the dies in predetermined relation to each other to induce rotation of the extruding tubular net. Either one or both dies can be rotated as long as the net effect on the relative rotational speeds of the dies is to induce rotation of the tubular net. Take-off, nip rolls and/or the windup means are positioned away from the mandrel and obliquely to the mandrel axis to pull the flat web being severed in a direction oblique to the axis of the mandrel to also rotate the tubular net in the same direction and at the same speed as induced by the dies. The nip or take-off rolls also impart the desired axial movement to the rotating tubular net so that the tubular net is severed only along the predetermined bias line thereof.

It is critical and essential that the induced rotation of the extruding tubular net made according to the process of either patent not produce excessive stress or strain on the unsolidified deformable extrudate, particularly at or near the die extrusion orifices because the extrudate at or near the extrusion orifices is generally too soft to sustain much stress without rupturing or deforming. In accordance with the present invention, one way of alleviating the effects of excessive stress or strain on the extrudate at or near the extrusion orifices in the process of U.S. Pat. No. 3,070,840, is to stop rotation of one of the dies and double the rotational speed on the other die whereby the tubular net will rotate at half the speed of the rotating die, operate the nip rolls to also rotate the tubular net in the same direction as the rotating die at half the speed thereof, and rotate the mandrel in the same direction as the rotating die but at half the speed thereof to alleviate the effects of friction forces between the mandrel and the rotating tubular net. When using these relative rotations, stresses and strains due to the induced rotational movement of the tubular net will not be transmitted to the extrudate at or near the extrusion orifices. Any multiple of rotational speeds other than that given may be used, such as halving the speed of one die, continuing to rotate the other die at its original speed to induce rotation of the tubular net in the same direction as the faster die but at one half the difference in speed between the dies, operating the nip or take-off rolls to also rotate the tubular net at one half the difference in speed between the two dies, and in the same direction as the faster die. The only requirement is that the net effect of the die, tubular net, and mandrel rotation be such as to rotate the extruding tubular net at a predetermined speed and to counterbalance the forces induced by the rotation of the tubular net at or near the extrusion orifices. In all cases, it is critical and essential that the speed of axial pulldown of the tubular net be correlated to the rotational speed of the tubular net so that it is severed along a predetermined bias line as set forth above.

It has been found that in order to produce a bias cut parallel to a strand in the process of U.S. Pat. No. 3,070,840, one of the dies must be stationary and the other rotated at twice its original speed otherwise the cut will be at an angle other than parallel to a strand. Rotation of both dies will not yield a cut parallel to a strand unless the cutter and windup are conjointly rotated at the speed of the outer die. However, if the rotation of one of the dies is stopped and pattern is a diamond having 90° angles between fibers, then the bias line on which the tube is cut will be at 45° to the tube axis.

In U.S. Pat. No. 3,252,181, both the inner and outer dies are normally rotationally stationary. To cause the tubular net to rotate without inducing too much stress or strain at or near the extrusion orifices, the die extruding axial fibers is rotated and the nip or take-off rolls are operated to also rotate the tubular net at substantially the same speed the die is rotated at and in the same direction thereof. The forming mandrel is rotated in the same direction and at the same speed as the rotating die and the tubular net is pulled axially downwardly by the nip rolls in predetermined relation to the rotational speed of the tubular net whereby the extruding tubular net is severed on a bias line thereof. It is also critical and essential here as in the other above described process, that the axial pulldown speed of the tubular net be correlated to its rotational speed so as to always sever the tubular net along the predetermined bias line.

Whether or not the die extruding the circular thread in U.S. Pat. No. 3,252,181, is rotated is of little importance and in either case will not substantially change the relationship between the speeds of the die extruding the axial fibers the mandrel, and the take-off or nip rolls. This is so because the extrusion of circular thread is intermittent and therefore any rotation given to the die extruding the circular thread will generally be insufficient to cause the tubular thread to rotate. When the tubular net produced according to the process of U.S. Pat. No. 3,252,181, is severed on a particular bias line parallel to a diagonal of the parallelogram axially oriented pattern, the axially oriented parallelogram pattern tube will be cut into a continuous flat web of length oriented diamond pattern netting.

In either of the above processes, the tubular net may be cut along two or more parallel bias lines simultaneously to form a plurality of flat webs each having the same length oriented pattern.

Also the tubular net made in accordance with the above processes may be formed into long tubes by cooling, setting, and severing the tubular net into long tubes of predetermined length and then later severing the tubular net along a bias line thereof to form the flat web in accordance with the instant invention. Further still, the tubular nets made according to the above processes may be oriented, i.e., pulled and stretched into other patterns by deformation of the fibers and then severed in accordance with the instant invention to form a flat web having a length oriented pattern different from, or even similar to, the original axially oriented tubular net pattern. The flat web length oriented pattern will be similar to the original axially oriented pattern under certain circumstances such as when the original axially oriented tubular net pattern is parallelogram shaped and is changed by orientation to a diamond pattern whereby bias cutting the oriented tubular net will yield a flat web having a length oriented parallelogram pattern.

The present invention may be used to cut or sever any tubular product to achieve the desired end product, regardless of whether the tube is knitted, film, of metal, solid or mesh structures, or of a solid shape with a mesh pattern superimposed thereon.

Referring now to the drawings wherein preferred embodiments are illustrated and in which like numerals refer to like parts:

FIG. 1 is a front view of a pair of dies used for extruding diamond or similarly axially oriented patterned tubular netting.

FIG. 2 is a bottom view taken along line 2—2 of FIG. 1 illustrating the dies.

FIG. 3 is a schematic isometric view of a preferred form of severing apparatus and tubular net rotation means.

FIG. 4 is a detail view of how the axially oriented diamond patterned tubular net is cut on a predetermined bias line to form a flat web having a length oriented square or rectangular pattern.

FIG. 5 is a front view of a pair of dies used for extruding axially oriented square or rectangular patterned tubular netting.

FIG. 6 is a bottom view taken along line 5—5 of FIG. 4 illustrating the dies.

FIG. 7 is a front sectional view of the die assembly of FIG. 4 in one position thereof.

FIG. 8 is a front sectional view of the die assembly similar to FIG. 7 illustrating a second position of the dies.

FIG. 9 is a schematic isometric view of a preferred form of cutting apparatus and tubular net rotation means.

FIG. 10 is a detail view of how axially oriented square or rectangular pattern tubular net is cut on a predetermined bias line to form a flat web having a length oriented diamond pattern.

Referring to FIG. 1, there is seen an extrusion apparatus 10 of the type disclosed in U.S. Pat. No. 3,070,840 from which a plurality of threads, strands or fibers 11, preferably of plastic, are extruded about a forming mandrel 12. The fibers are usually extruded into a setting or cooling bath (not shown).

The extrusion apparatus includes a pair of coaxial dies 13, 14 at least one of which is rotatable with respect to the other. Each die has a plurality of extrusion orifices 15, 16 therein respectively from which plastic material is extruded.

To produce tubular netting having an axially oriented diamond pattern, the dies 13, 14 are counter-rotated with respect to each other, at the same speed. The fibers 11 extruding from extrusion orifices 15 in die 13 contact the fibers extruding from the extrusion orifices 16 in die 14 during counterrotation to form the tubular net 11a having an axially oriented diamond pattern 11b (FIG. 4). However, because the dies 13, 14 are rotating in opposite directions at the same speed, the extruding tubular net will simply extrude axially away from the dies without any rotation. Axial motion is normally imparted to the tubular net by winder 17 or nip rolls 17a (FIG. 3) which are generally placed below the forming mandrel 12. The take-off or nip rolls axially pull the tubular net at a speed consistent with the speed of rotation to allow the fibers to extrude freely from the dies but not fast enough to unduly thin the extruding fibers.

To give rotational movement or twist to the extruding tubular net 11a, the dies 13, 14 are counter-rotated with respect to each other but at different speeds whereby the tubular net 11a is induced to rotate at one half the difference in speed between the dies and in the direction of rotation of the faster die. The nip rolls 17a and winder 17 (FIG. 3) are placed oblique to the axis of the forming mandrel and offset therefrom to exert both an axial force on the tubular net and a force parallel to the forming mandrel surface to both rotate the tubular net and pull it axially away from the dies, so that the tubular net 11a is severed on a bias line such as the bias line 11c (FIG. 4) by knife 18. The flat web 19 so produced is rolled upon winder 17. To cut parallel to an extruding fiber however, one of the dies must be stopped otherwise the cut will be on a bias line other than parallel to one of the extruding strands unless the cutter, nip rolls and winder are rotated at the same speed as the outer die.

Any means including heat may be used to sever the tubular net and the process is not limited to the use of a knife.

The tubular net is severed substantially as shown in FIG. 4 along bias line 11c so that the axially oriented diamond pattern 11b of the tubular net will be transformed into a flat web 19 having a length oriented parallelogram pattern.

The rotational movement of the tubular net must be correlated to the axial speed thereof in order to obtain a length oriented parallelogram pattern flat web 19 from the axially oriented diamond patterned tubular net 11a. The tubular net must always be severed on one of a family of bias lines of the tubular net 11a which corresponds to a particular helix line thereon and therefore, the tubular net must make one full rotation about the forming mandrel axis for each increment of axial movement 21 of the tubular net, the increment being substantially equal to the lead of helix in order to assure that the flat web 19 will have a length oriented parallelogram pattern. As a result of rotating the tubular net about the axis of the mandrel, the individual strands must follow their own individual fixed helical path over the surface of the mandrel and one of the two sets of strands will follow a fixed helical path parallel to the bias cutting line 11c.

Because the extrudate at or near the dies 13, 14 is still soft and deformable, it is critical and essential to alleviate stresses on the extrudate at or near the extrusion orifices 15, 16 induced by rotation of the tubular net 11a. One manner of achieving this is to rotate the mandrel in the same direction as the rotating die and at half the speed thereof so that in effect, the respective rotations of the tubular net, dies and mandrel, while inducing rotation of the tubular net will prevent the induced rotation from being seen as a twisting force on the extrudate at or near the extrusion orifices. This eliminates transfer of a substantial portion of the stresses and strains to the fresh extrudate near the extrusion orifices by the rotating tubular net 11a, without substantially affecting the shape of the axially oriented diamond pattern thus formed. In other words, the extrudate at or near the extrusion orifices sees substantially the same forces thereon as it would if just the dies themselves were counterrotating at equal speeds. Rotation of the net tube will of necessity cause each individual strand to follow its own fixed helical path over the surface of the mandrel with one set of strands moving parallel to the bias cutting line 11c regardless of the speed at which the mandrel is rotated. However, when the path of the individual strands is considered relative to the surface of the mandrel, it will be seen that each individual strand will only move axially relative to the surface of the mandrel when the mandrel is rotated at exactly the same speed at which the tubular net rotates. When there is any difference in the speed at which the net tube and mandrel rotate, then each individual strand will trace a fixed helical path relative to the surface of the mandrel and the fixed helical path that each strand traces relative to the surface of the mandrel will be in the nature of a broad helical band when the difference in the speed of rotation of the mandrel and net tube is small and as the difference in speed of rotation increases the trace of the broad band will be narrowed down.

Referring now to FIGS. 5 through 10, there is seen an apparatus 21 for extruding tubular net 22 having an axially oriented square or rectangular pattern 22a. In this process, the outer die 23 is normally stationary with respect to the inner die 24, the inner die 24 being moveable in an axial direction in a manner hereinafter described.

To form a square or rectangular patterned tubular netting, the fibers are axially extruded from the die 23 through a plurality of extrusion orifices 25 in die plates 26 which may be of any shape. Inner die 24 is periodically lifted up to expose circular extrusion orifice 27 to form a circular fibers 28 whereby the combination of axial and circular fibers forms the axially oriented square or rectangular patterned tubular net 22.

FIG. 9 is a isometric view of the process of this embodiment and shows the tubular net 22 extruding in a horizontal direction. In practice, the tubular net is extruded vertically downwardly and is shown here horizontally only to facilitate description and understanding.

The extruding tubular net 22 in this embodiment normally has no rotation imparted to it by the dies. In order to rotate the tubular net, the die 23 is rotated, the tubular net 22 being rotated in the same direction and at the same speed as the rotating die. Nip or take-off rolls 29a are placed oblique to the axis of the forming mandrel 30 and parallel to the surface thereof as in the first embodiment to also impart rotational movement to the tubular net 22 and to further impart axial movement to the tubular net, so that the tubular net is moved axially away from the dies a distance equal to the distance 32 between subsequent squares or rectangles during which time the tubular net is rotated a distance equal to the distance 32a whereby the tubular net 22 is severed along a bias line such as line 22b. The bias line in this case a diagonal can be any helix line that will transform the axially oriented pattern of the tubular net to the desired length oriented pattern of the flat web. A knife 31 is placed against the surface of the tubular net, preferably after the mandrel 30. A cutting form may be used to support the net during cutting (not shown). Any means may be used to sever the tubular mandrel along a helix line thereof including heat. It is understood that any combination of rotational and axial speeds may be used to sever the tubular net along any predetermined bias line other than a diagonal.

From the above, it is seen that the knife 31 cuts along a helix line of the tubular net whereby the severed tubular net is transformed into a continuous flat web 33 having a length oriented diamond pattern 34 instead of the axially oriented square or rectangular patterns 22a of the tubular net 22. The flat web 33 is then rolled up on a winder 29.

As in the prior embodiment, it is critical and essential to alleviate the stress and strain effect of the induced rotation on the extrudate at or near the extrusion orifices before the extruded fibers have had a chance to set. One way of accomplishing this is to rotate the mandrel in the same direction as the rotating die at the same speed thereof. Also, the dies 23 and 24 may both be rotated at the same speed as the die 23 in the same direction as the die to balance the rotationally induced forces on the extrudate near the extrusion orifices, the die 24 having substantially no effect on the rotational speed of the tubular net. It will be understood that any combination of rotational and axial speeds may be used as long as the rotations of the mandrel, tubular net and dies allow the tubular net to rotate so that it may be severed along a predetermined bias line as long as the forces induced by the rotating tubular net on the extrudate in the vicinity of the extrusion orifices are substantially counterbalanced.

It will be understood that it is intended to cover all changes and modifications of the preferred embodiments of the invention herein chosen for the purpose of illustration which do not constitute departures from the spirit and scope of the invention.

What is claimed is:

1. A method for extruding a tubular net of polymer made of at least two intersecting fibers and for cutting the extruded tubular net to change the axial pattern of the net in apparatus of the type that includes a pair of associated die members for extruding the fibers in the form of a tubular net and means for drawing the tubular net over a forming mandrel which comprises the steps of:
    a. extruding a tubular net made of at least two intersecting fibers by means of said die members,
    b. rotating the said two die members relative to each other to rotate the extruded tubular net,
    c. passing the tubular net in longitudinal direction over the said forming mandrel,
    d. causing the forming mandrel to rotate independently of said dies and net to rotate the tubular net thereon at a speed substantially equal to the speed of rotation imparted to the extruded tube by said die members to avoid excessive twisting and strain on the extruded net fibers in the area between said mandrel and extrusion die members,
    e. cutting the rotating tube along at least one selected path to form a flat web of net having a length pattern different from the axial pattern of the tubular net.

2. The method specified in claim 1 which includes the steps of rotating each of said die members in a different direction and at a different rate of speed to impart rotation to said tubular net at a speed of about one half the difference in speed between the two die members and in the direction of rotation of the faster moving die member.

3. The method specified in claim 1 which includes the step of rotating only one of said die members to cause the tubular net to rotate as it is extruded from the die members.

4. The method specified in claim 1 which includes the step of continuously extruding one of said fibers and intermittently extruding the second fiber to form the tubular net.

5. The method specified in claim 1 which includes the step of cutting the rotating tube of net at a location which is stationary with respect to the extrusion apparatus.

6. The method specified in claim 5 which includes the step of winding the flat web of net on a roll located in a stationary position with respect to the extrusion apparatus.

7. A method for extruding a tubular net of polymer made of at least two intersecting fibers and for cutting the extruded tubular net to change the axial pattern of the net in apparatus of the type that includes a die having an inner and an outer member each of which extrudes one of said fibers in the tubular net and means for drawing the tubular net over a forming mandrel which comprises the steps of:

a. extruding a tubular net made of at least two intersecting fibers at least one of which is extruded by each die member,
 b. rotating the outer die member in one direction and rotating the inner die member in a different direction and at a speed less than that of the outer die member to cause the tubular net to rotate in the direction of the outer die member and at a speed of about one-half the difference in the speed of the two die members,
 c. passing the tubular net in longitudinal direction over the said forming mandrel,
 d. causing the forming mandrel to rotate independently of said dies and net to rotate the tubular net thereon at a speed substantially equal to the speed of rotation imparted to the extruded tube by the die members to avoid excessive twisting and strain on the fibers of the net in the area between said mandrel and die members,
 e. cutting the tube along a path parallel to one of the fibers in the net to form a flat web of net having a length pattern different from the axial pattern of the tubular net.

8. The method specified in claim 7 which includes the step of cutting the tube along a substantially helical path.

9. The method specified in claim 7 which includes the step of preventing rotation of the inner die member.

* * * * *